No. 627,664. Patented June 27, 1899.
H. ZIMMERMAN.
HOSE COUPLING.
(Application filed Dec. 23, 1897.)
(No Model.)

UNITED STATES PATENT OFFICE.

HARRY ZIMMERMAN, OF FREDERICK, MARYLAND.

HOSE-COUPLING.

SPECIFICATION forming part of Letters Patent No. 627,664, dated June 27, 1899.

Application filed December 23, 1897. Serial No. 663,230. (No model.)

*To all whom it may concern:*

Be it known that I, HARRY ZIMMERMAN, a citizen of the United States, residing at Frederick, Frederick county, State of Maryland, have invented certain new and useful Improvements in Hose-Couplings, of which the following is a specification.

My invention has for its object to couple together the adjacent ends of flexible pipes; and my invention consists of a coupling device composed of a rigid tube having enlargements near the ends and rings adapted to pass from one to the other of the pipes and to close the joints tightly regardless of the thickness of the pipes, substantially as described hereinafter and illustrated in the accompanying drawings, in which—

Figure 1:
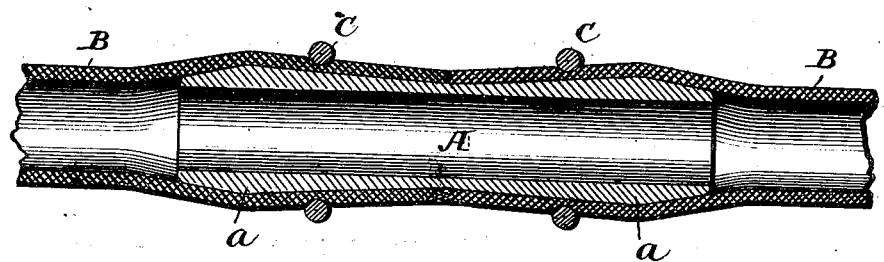
Figure 2:
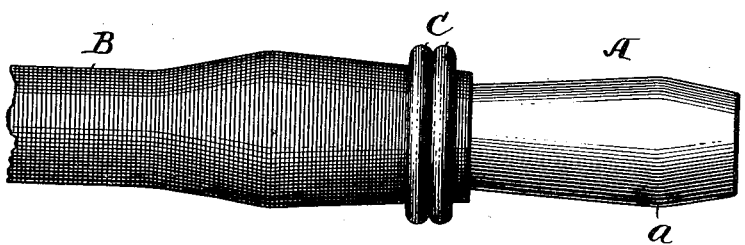

Figure 1 is a longitudinal section of my improved pipe-coupling, and Fig. 2 is an exterior view of one of the pipes detached.

A is a rigid tube, preferably of metal and having a smooth outer face with an enlargement $a$ near each end, the tube preferably tapering in both directions from said enlargement, as shown in Figs. 1 and 2, so that the ends of two flexible pipe-sections B B may be readily passed onto the opposite ends of the coupling-tube and meet at the center of the latter, thereby wholly covering the tube.

C C are two rings, preferably of round wire with smooth faces, each adapted to pass fully over the enlargements, but of such size that when the pipes B B are upon the ends of the tube the said rings cannot be applied or withdrawn over the ends of the tube.

In connecting the pipe-sections by the coupling device one end of the tube A is first introduced into the end of one section, and then both rings C C are passed over the exposed end of the tube A and placed upon that part of the pipe B which is inside the enlargement $a$ and is not expanded thereby. The end of the other pipe-section is then passed onto the exposed end of the tube A, and the inner of the two rings, Fig. 2, is carried to the right and the other is moved to the left to the position shown in Fig. 1. As the rings are carried toward the expanded portions of the pipes the latter are compressed upon the inner tapering parts of the enlargements, and owing to the presence of these inner tapering parts any draft upon the pipes will tend to draw the latter gradually over those parts, compressing them more and more between the same and the rings, so that no amount of draft will separate the pipe-sections from the coupling device or tend to loosen the joints. On the contrary, the joints will be tightened in proportion as the draft is increased.

If it becomes necessary to detach either pipe-section, this can be done by shifting the ring C off of the end of said section and onto the other and withdrawing the released section from the coupling-tube. It will be seen that this can be effected without the necessity of disturbing the undetached sections in any way, without turning either the rings, the tube, or the pipes, and without abrading the exterior or interior of either pipe-section.

It is very desirable that the taper from the middle part of the pipe to each enlargement be comparatively long and a straight taper, because there is then a long range of adjustment for the rings, and whether the pipe be thick or thin the rubber is held tight to the inclined face, and whatever the position of the ring the pressure always is in the same direction, which would not be the case if the taper was upon a curved line.

While the rings may be of different shapes, I prefer to make them of wire round in cross-section, as when such ring is applied the pressure exerted upon the pipe resting on the tapering tube is practically always inward and there is no backward pressure against the face of the ring nor any tendency to become loose. The ring is further detained by the action of the rubber in expanding to normal size on each side of each ring, which would not occur with a wide flat ring.

While it is preferable, it is not absolutely necessary to make the face of the tube inside the enlargements tapering, as shown in Figs. 1 and 2, as the enlargements may contract abruptly, forming shoulders.

Without limiting myself to the precise construction shown and described, I claim—

1. A pipe-coupling comprising a rigid tube formed in a single piece having an exterior annular smooth-surfaced enlargement near each end, each of which tapers toward the center of the tube and also toward an end thereof, the said tube being adapted to receive the adjacent ends of flexible pipes and rings adapted to pass from the end of one flexible pipe to the other, substantially as described.

2. The combination of a rigid tube formed of a single piece having its ends and central portion of uniform external diameter and exterior annular smooth-surfaced enlargements tapering toward the ends and center of the tube, flexible pipes surrounding the tube and having their ends abutting at the longitudinal center thereof, and rings formed with round bearing-surfaces adapted to pass over the ends of the flexible pipes, substantially as described.

In testimony whereof I have signed my name to this specification in the presence of two subscribing witnesses.

HARRY ZIMMERMAN.

Witnesses:
W. CLARENCE DUVALL,
PAUL W. STEVENS.